Inventors
FREDERICK ROBERT BOOSEY,
JOHN LOXHAM, ALBERT
EDWARD CASTLETON AND
CHARLES JOHN HART
By
Haseltine, Lake & Co.
Attorneys

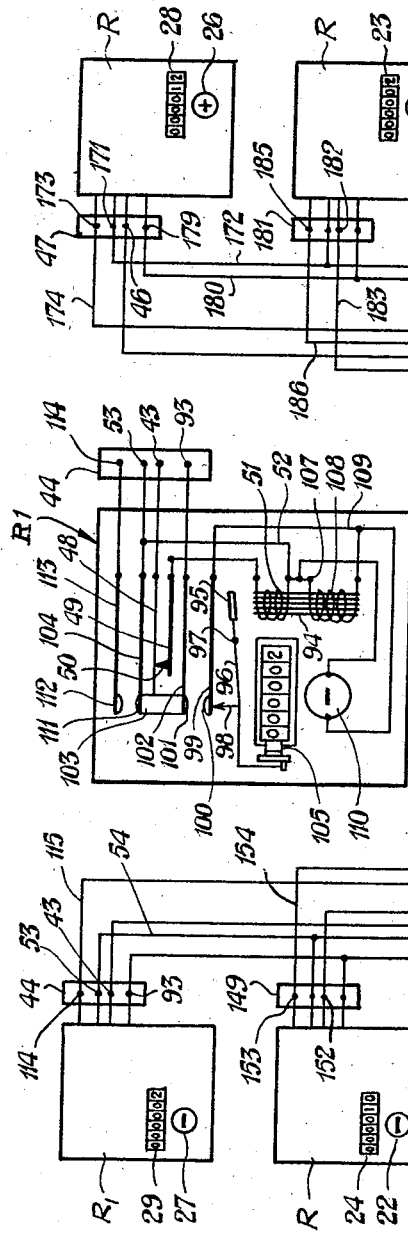

Patented June 12, 1951

2,556,413

UNITED STATES PATENT OFFICE 2,556,413

MACHINE FOR INSPECTING WORKPIECES

Frederick Robert Boosey, John Loxham, Albert Edward Castleton, and Charles John Hart, Letchworth, England, assignors to The Sigma Instrument Company Limited, Letchworth, England Application March 5, 1946, Serial No. 652,090
In Great Britain March 15, 1945

4 Claims. (Cl. 209—88)

This invention relates to machines for inspecting work-pieces.

In the production of work-pieces to some standard pattern it becomes necessary to ensure that the work-pieces are correct to a nominal standard of correctness. Usually in the mass production of work-pieces the dimensions of these work-pieces are fixed with certain limits of error tolerance. It is an object of the invention to devise a machine which will be capable of inspecting work-pieces and permitting them to be sorted according to whether they are nominally correct or "oversize" or "undersize" as regards any particular dimension that is of importance. According to the invention a machine for inspecting work-pieces comprises a bed, measuring devices disposed upon the bed to measure several dimensions of the work-piece, a work-piece holder arranged to receive a work-piece and to displace it to a gauging position where it is gauged or inspected by all said measuring devices, and further arranged to withdraw the inspected work-pieces from said gauging position there being electrical circuits controlled by said measuring devices so that according to whether a measuring device records undersize or oversize or nominal correctness of the piece in regard to the dimension inspected thereby, such electrical circuits are set to operate correspondingly recording and/or indicating means. Following the principles of the invention a machine may be designed which is wholly automatic as regards the feeding of the work-pieces and, moreover the recording means may take the form of sorting means automatically controlled according to the results of the gauging inspection. This will become apparent from the description which follows hereinafter.

For a better understanding of the nature of the invention a constructional form thereof will now be indicated in greater detail by way of example, and with reference to the accompanying drawings in which—

Figure 1:
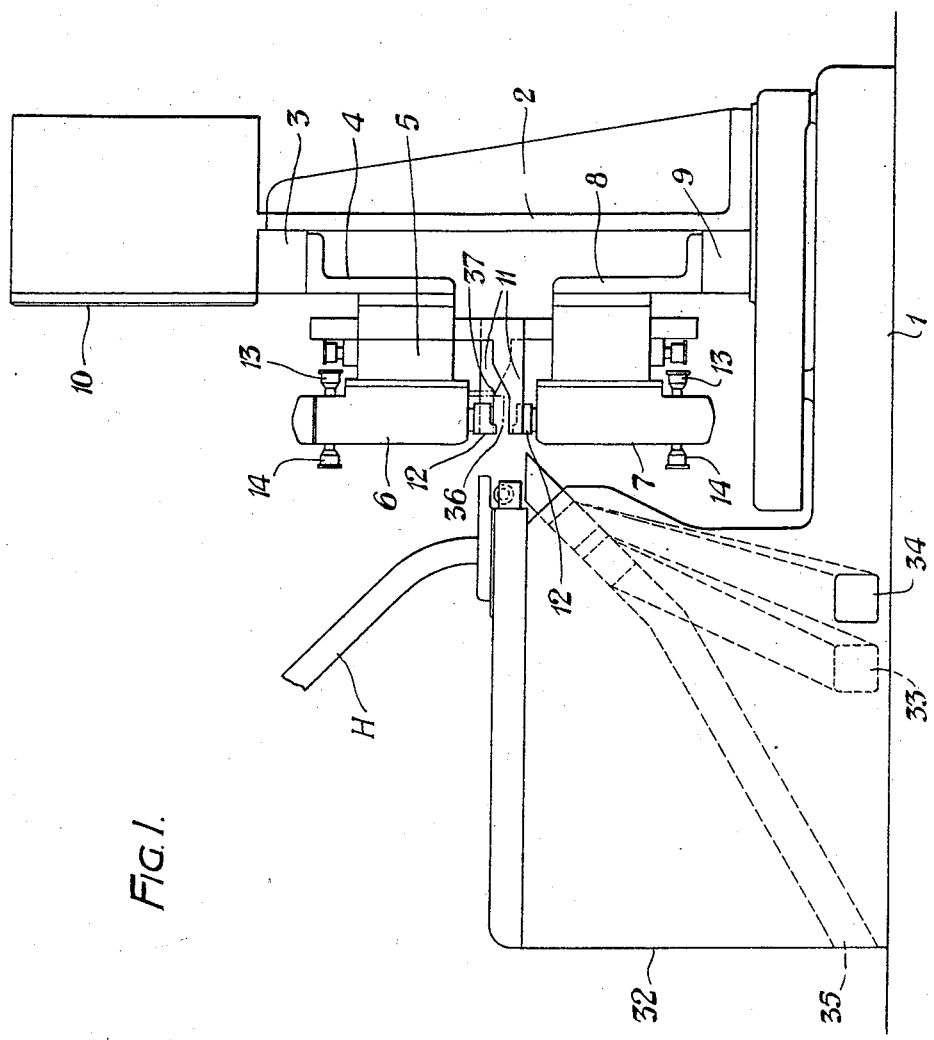
Figure 2:
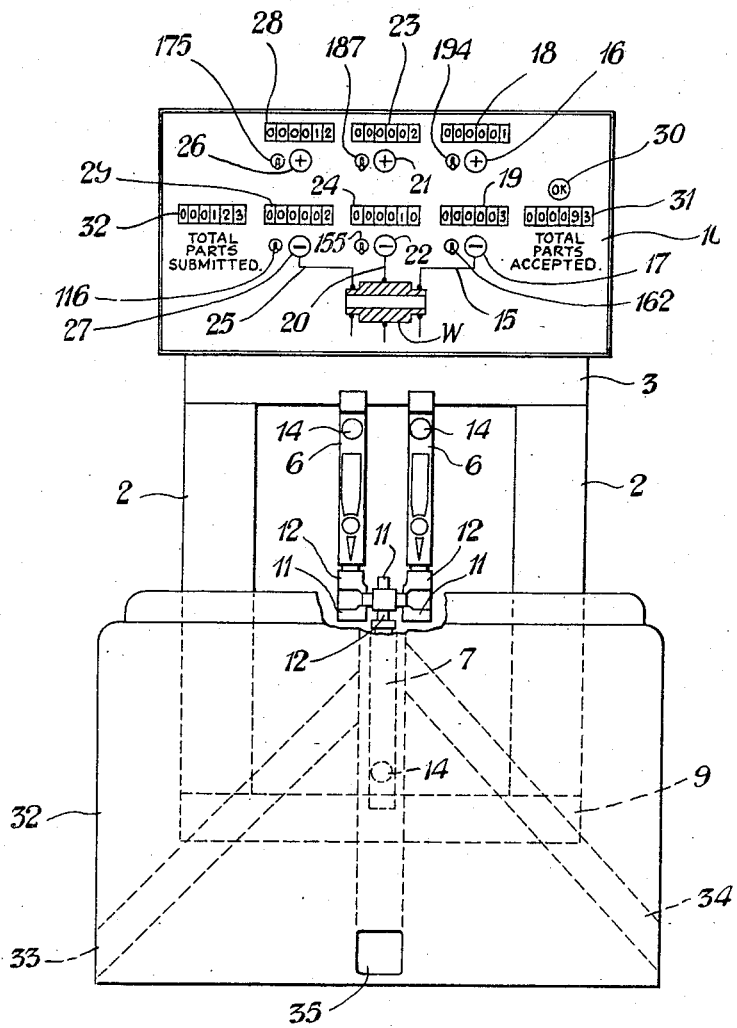
Figure 3:
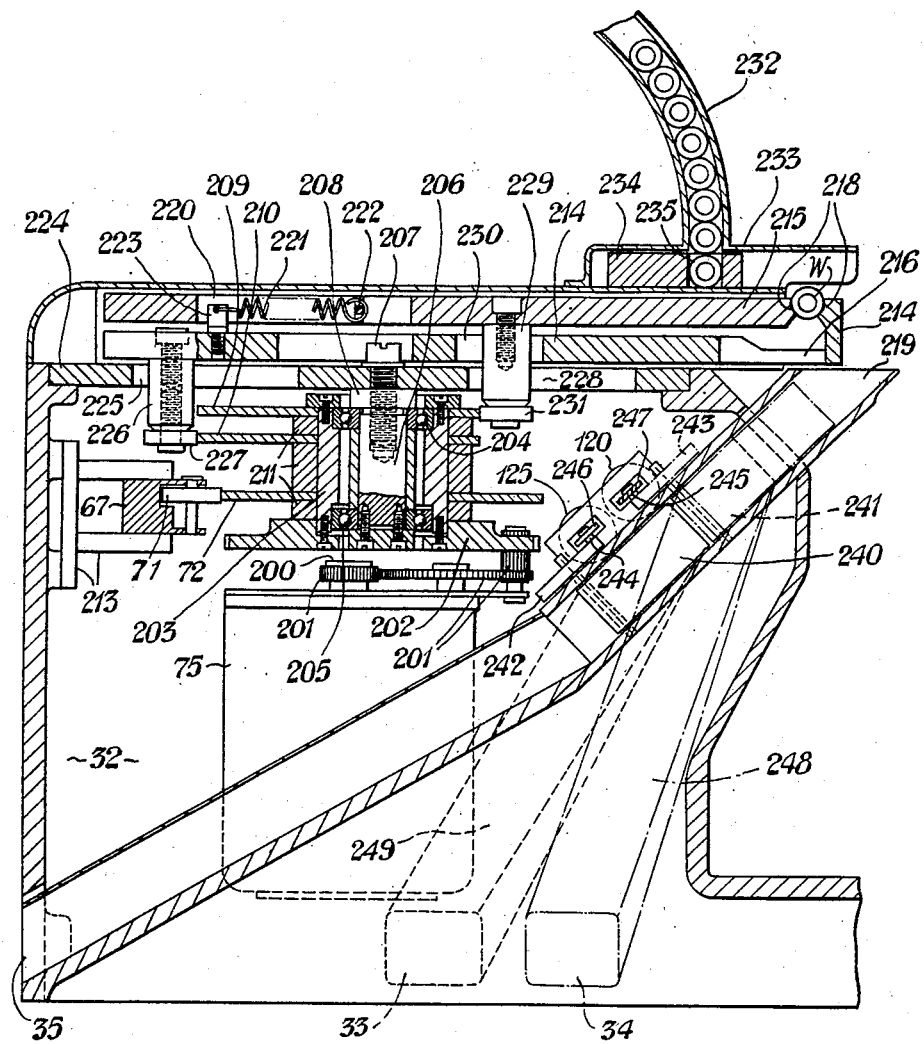
Figure 5:
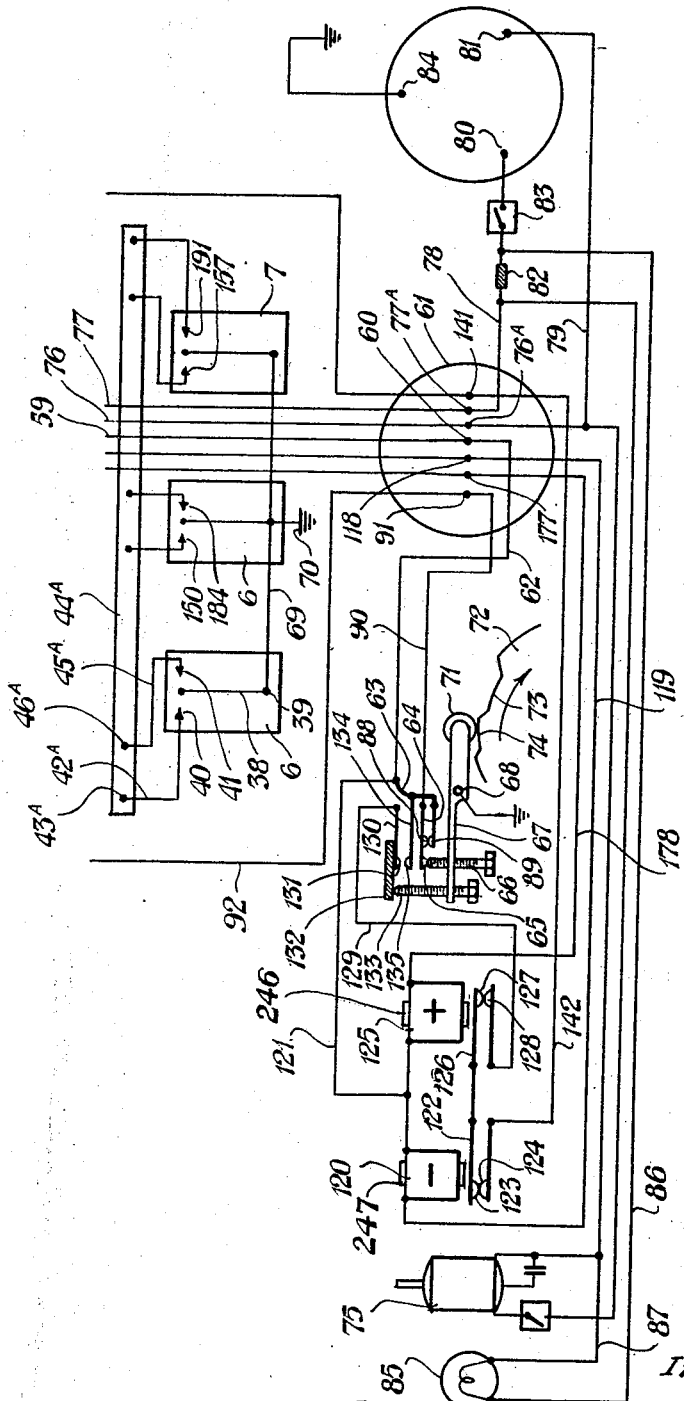

Figure 1 is a side elevation of a machine indicating the layout of the parts thereof, Figure 2 is a corresponding front view of the machine, Figure 3 is a section through the principal operating mechanism of the machine, Figures 4 and 5 together form a wiring diagram showing the electrical circuit arrangements, and Figure 6 shows diagrammatically an electrical device indicated in outline only in Figures 4 and 5.

It will be seen from Figs. 1 and 2 that the machine essentially comprises a horizontal bed 1 the front end of which is built up to contain feeding mechanism whilst the rear end carries a pair of vertical pillars 2. A transverse member 3 is secured to the pillars 2, and has brackets 4 for the supporting mechanism 5 of two measuring devices 6 secured to it. In this example there is a third measuring device 7 whose fixing bracket 8 is rigidly attached to a further transverse member 9 secured indirectly to the bed 1 of the machine. For the sake of simplicity in this example, it is supposed that the particular work-piece which is to be inspected by the machine has three dimensions of importance. A representation of the work-piece W is engraved upon a panel 10 which is secured at the upper ends of the pillars 2. It will be observed that the work-piece W consists of a small collar which is shouldered at either end to have three principal external diameters. Each of the measuring devices 6 and 7 are constructed in a precisely similar manner. As will be appreciated from the description which follows hereinafter, the precise nature of the measuring devices is not of importance for the purpose of the present invention. It will suffice to indicate that each such device possesses a reference anvil 11 and a primary gauging anvil 12. A pair of opposed electrical contacts are arranged in the body of each device and their setting is controllable with the aid of the contact control heads 13 and 14. The body of each measuring device essentially contains a pivoted lever one end of which carries an electrical contact that may engage the contact corresponding to the head 13 or the contact corresponding to the head 14. The angular position of the lever is determined by translational gauging movements performed by the primary gauging anvil 12. The supporting mechanism of each of the measuring devices permits these devices to be adjustably secured in any desired position with regard to their supporting brackets, and the reference gauging anvils 11 may also be adjustably secured in a desired position. It will be readily appreciated that if a work-piece is placed between a reference gauging anvil 11 and a primary gauging anvil 12 of, say, one of the measuring devices 6, the measuring devices may be so adjusted that if the external dimension which is being callipered by that device is nominally correct, the lever within the body of the device engages neither of the electrical contacts therein. If the component which is being callipered should have a dimension greater than permitted by the upper limit of tolerance, then the pivoted lever of the measuring device can indicate this condition because the gauging anvil 12 of the device 6 will tend to move upwardly as the work-piece is oversize, and this is arranged to cause the lever within the measuring device body to engage one of the electrical contacts thereof. If the component should be undersize, that is to say if the callipered dimension should be less than permitted by the lower limit of tolerance, then the anvil 12 will tend to move slightly downwardly and hence the lever within the measuring device can be set over to an opposite position where it engages the other contact. The measuring devices 6 serve to gauge the diameters of the right and left hand ends of the work-piece W as seen in the representation of the work-piece upon the panel 10. An engraved leading line 15 connects one of the dimensions concerned with a pair of signal windows 16 and 17. The window 16 bears a plus indication and the window 17 a minus indication. Above the window 16 there may be seen the indicating mechanism 18 of a counting device of known kind. Associated with the window 17 there is a similar indicating mechanism 19 of a known counting device. In a like manner, the central dimension of the work-piece is joined by an engraved leading line 20 which associates this dimension with a set of signal lights 21 and 22 each having associated counting devices 23 and 24. The third dimension of the work-piece W is indicated by the engraved leading line 25 having the associated windows 26 and 27 and counting devices 28 and 29. On the right-hand end of the panel there is a further window 30 bearing the letters "O. K." and associated therewith is a counting device 31. At the left-hand end of the panel there is a counting device 32 in association with which are engraved the words "Total parts submitted." In association with the window 30 and counting device 31 there is the engraved legend "Total parts accepted."

The casing 32 built up at the front of the bed 1, as previously indicated, serves to contain feeding mechanism for the work-pieces to be inspected. There are two lateral outlets 33 and 34 through which the work-pieces that have been inspected may leave the machine. As seen in Fig. 2, there is a main outlet 35 also intended for escape of tested or inspected pieces. In a manner which will be understood from the description which follows, the outlet 33 is concerned with pieces which are oversize i. e., work-pieces that may be corrected, whilst the outlet 34 is associated with pieces which are undersize and therefore probably wholly rejectable. The outlet 35 may then be concerned with the discharge of pieces which are nominally correct, that is to say within the limit of tolerance of error set for the work-piece.

It will now be useful to indicate how the machine, briefly described above, is intended to operate. Work-pieces are fed from a hopper H into a reciprocating work holder which carries the work-pieces one by one to a gauging position between the various gauging anvils of the measuring devices 6 and 7. These latter gauge the work and if all the dimensions of a work-piece are gauged as being nominally correct, only the signal window 30 is illuminated and the counters 31 and 32 operate to show that another work-piece has been submitted and accepted as being of nominally correct dimensions. As soon as the work-piece has been so gauged it is released into a chute and is directed to the outlet 35. Each time a work-piece reaches the gauging position between the gauging anvils, the work-piece is caused to press against a light pointer indicated in chain-dotted lines at 36 in Fig. 1 which serves to close a switch 37. The closing of the switch 37 causes the counting device 32 to operate and indicate that a further part has been submitted for examination.

If the work-piece or part is gauged as being undersize in regard to one of the dimensions, for example the dimension indicated by the leading line 15 upon the panel, then the signal window 17 is illuminated and the counting mechanism 19 makes a record. Simultaneously shutter mechanism operates to cause the part or work-piece to emerge through the outlet opening 34 when the work-piece is removed from the gauging position.

The machine may be so set up that if any one of the three dimensions measured is found undersize, the submitted work-piece is rejected through the outlet opening 34. If on the other hand no dimension is found undersize but one or more dimensions are detected as being oversize, then the part may be rejected through the outlet opening 33. It will be appreciated that in general if a work-piece is rejected as undersize, that work-piece may have to be scrapped, whereas if it is oversize it may be altered subsequently so as to make it acceptable. In this connection it will be noted that if internal dimensions of a work-piece are being checked, where these dimensions are greater than permitted by an allowable limit of tolerance, this will correspond to an undersize work-piece although the particular dimension concerned is in point of fact oversize. Thus in referring to a work-piece herein as being "undersize," this expression is taken to mean that the work-piece has too little material in it as judged by some standard of nominal correctness. A similar meaning in an opposite sense is to be ascribed to the word "oversize" used hereafter.

Reference will now be made to Figs. 4, 5 and 6 of the drawings, which show diagrammatically the electrical circuit employed for one constructional form of the invention. The three measuring devices 6 and 7 are diagrammatically illustrated and since they are all identical as regards construction, the details of one of them will suffice to indicate the nature of the rest. One of the devices 6 has a pivotally mounted arm 38 the pivotal anchorage being indicated at 39. The free end of the arm 38 may co-operate with either of the contacts 40 or 41. When the arm 38 co-operates with neither of the contacts 40 and 41, the gauging anvil associated with measuring device 6 is then recording nominal correctness in the work-piece that is being gauged. If the arm 38 engages the contact 40 this corresponds to, say, undersize of the gauged dimension, whereas if the arm co-operates with the contact 41 this would then correspond to oversize. A lead 42A connects the contact 40 with a terminal 43A upon a terminal strip 44A. A second lead 45A connects the contact 41 with a further terminal 46A upon the terminal strip 44A (see Fig. 5). From the terminal 43A a lead 42 exends to a terminal 43 upon a terminal strip 44 (see Fig. 4). Similarly, a lead 45 extends from the terminal 46A to a terminal 46 upon a terminal strip 47. The terminal strip 44 is associated with a relay device R1 the details of which are shown in Fig. 6, and the terminal strip 47 is associated with an exactly similar relay device.

The terminal 43 (Fig. 6) connects with a conducting spring blade 48 with which there is associated a blade 49 carrying a contact 50. When the relay associated with the terminal strip 44 is not being energised, the contact 50 engages the spring blade 48, and the blade 49 is connected to one side of a coil 51. The other side of the coil is joined to a lead 52 which is connected with a terminal 53 upon the strip 44. Connections 54 and 55A (Fig. 4) join the terminal 53 over a switch Z to a lead 55 running to the terminal 56 of one side of the secondary winding 57 of a transformer. The other side of the winding 57 has a terminal 58 joined by a lead 59 to a terminal 60 of a junction box 61 (Fig. 5) from whence a lead 62 runs to a conducting bar 63 carrying a spring blade 64 insulated from it. A contact 65 on the spring blade is adapted to co-operate with a contact screw 66 supported in a pivoted lever 67. The pivot may be considered as lying at the point 68 which is indicated as being earth connected. It will be observed that the pivot point 39 of the arm 38 is joined by a lead 69 which is similarly shown as earth connected as at 70. The lever 67 has a follower roller 71 engaging the periphery of a cam disc 72. A portion of the cam disc 72 is seen in Fig. 5 and an arrow indicates the direction of rotary motion of the disc. The periphery of the disc bears two cam surfaces 73 and 74 so that the lever 67 has three positions of angular adjustment about its pivot 68. There is the position illustrated where the follower 71 is riding upon the cam surface 74 which represents an intermediate position. There is next the upper-most position of the follower 71 where it rides upon the periphery of the cam disc 72, and finally the lowest position of the cam follower 71 where it rides upon the cam surface 73. The disc 72 is driven at a uniform speed by a motor 75 which serves also to drive the work-piece feeding arrangements. When a work-piece is in position between the measuring devices and is being gauged, the follower 71 is nearing the end of its travel upon the cam surface 73. The contact screw 66 and contact 65 are, as shown, in engagement when the follower 71 is upon the intermediate cam surface 74. Such engagement continues until the follower 71 rises upon the periphery of the cam surface when it is broken and it is resumed only when the follower 71 falls to the level of the lowest cam surface 73.

The primary winding 57A of the transformer having the secondary 57 is joined by leads 76 and 77 to a pair of terminals 76A, 77A upon the junction box 61, from whence leads 78 and 79 complete a circuit to mains terminals 80 and 81 (see Figs. 4 and 5). In the lead 78 there is included a fuse 82 and a switch 83. The third mains terminal 84 is connected to earth. A coloured lamp 85 is connected by a lead 86, and by a lead 87 which is joined to the connection 79. Thus the pilot lamp 85 serves to indicate whether the switch 83 is in the "on" or "off" position and thus whether the electric supply is available to the machine.

It will now be understood that the terminals 56 and 58 of the secondary winding 57 serve as the supply terminals for the internal circuits of the machine. Assuming for the sake of explanation that the work-piece has just arrived between the measuring devices, and is being gauged, then the lever 67 will have its follower 71 upon the lowest cam face 73 and the contact screw 66 will be co-operating with the contact 65. The blade 64 is however insulated from the conducting member 63, and carries an additional contact 88 adapted to co-operate with a contact 89 carried on a blade electrically connected with the conducting member 63. When the follower 71 is upon the face 73, the contact screw 66 presses the blade 64 upwardly to an extent such that the contacts 88 and 89 do not co-operate. It will be observed that the blade 64 is connected by a lead 90 through a terminal 91 of the junction box 61, to a lead 92 extending to a terminal 93 upon the terminal strip 44. Thus when the gauging of the work-piece is taking place the terminal 58 of the secondary winding 57 is not effectively in electrical connection with the contact 65, for the reason that the contact pair 88 and 89 are not in co-operation and thus the arm 38 which is earthed, has no electrical supply from the lever 67. The arm 38 may therefore, engage either of the contacts 40 or 41 without any danger of sparking since there is no electric circuit closed by such engagement as long as the contacts 88 and 89 are not in co-operation.

Let it be supposed that the dimensions gauged by one of the gauging devices 6 correspond to undersize of the work-piece, then the arm 38 will engage the contact 40 and will remain in this position as long as the work-piece is being gauged. The disc 72 continues to rotate until the follower 71 rises up upon the cam face 74. In this position the lever 67 swings the contact screw 66 downwardly and permits the contacts 88 and 89 to engage. Under these circumstances a circuit is completed from the terminal 58 of the winding 57 through lead 59, lead 62, conducting member 63, contact 89, contact 88, contact 65, contact screw 66 and hence to earth. The circuit is continued from earth to the arm 38 which is then engaging the contact 40 which is connected to the terminal 43 of the relay device R. The circuit is continued through the contact 50 (Fig. 6) the winding 51, lead 52, terminal 53, lead 54 and lead 55 which is connected to the other terminal 56 of the transformer secondary.

Completion of the circuit described above will result in the energisation of the winding 51 of the relay R. This winding is arranged upon a core 94 with which is associated an armature 95 carried upon a lever 96 pivotally mounted as at 97. The armature 95 is attracted to the core 94 and causes a finger 98 upon the lever 96 to engage a contact blade 99 and to force the latter upwardly so that its contact 100 is brought into engagement with a contact 101 carried by a blade 102. A distance piece 103 of insulating material is supported by the blade 102 and is also partially supported by the blade 48. A further blade 104 is also associated with the insulated distance piece 103. The lever 96 serves to operate a counting mechanism 103 of known type, which mechanism advances one step when the armature 95 is attracted to the core 94. Return movement of the armature 95 to its normal position illustrated in Fig. 6, is not recorded by the counting mechanism 105.

The finger 98 can move the blade 99 upwardly in two stages. In the first stage the upward movement is sufficient only to produce engagement of the contacts 100 and 101. In the second stage the insulated distance piece 103 is moved bodily upwardly with the result that the contact 50 no longer engages the blade 48. Before however the contact 50 is so disengaged, an electrical circuit is completed as between the terminals 53 and 93 as follows. From the terminal 53 the connection 52 is joined to one end 107 of a further winding 108 upon the core 94. The other end of the winding 108 is joined to a lead 109 connected to the blade 99. The circuit is continued by the contacts 100 and 101 and is thus extended to the terminal 93. From this latter terminal a connection 92 extends to the terminal 91 of the junction box 61. Hence the coil 108 is now energised and this coil is of heavier duty type than the coil 51. There will be a momentary period when both coils 108 and 51 are simultaneously operating, but as the heavy duty coil 108 causes the armature 95 to be strongly attracted to the core 94, the insulated distance piece 103 will move to disengage the contact 50 from the blade 48 and thus the coil 51 will no longer have its circuit completed. The two stage operation of the lever 96 will now be understood since the first stage corresponds to operation of the starting coil 51, which operation serves merely to connect the main coil 108 for the second stage operation during which the counting device 105 is operated and the distance piece 103 is moved to break the circuit of the coil 51 by opening of the contact 50.

The circuit completed through the coil 108 will no longer include the measuring device 6, which will in fact be totally de-energised by the disengagement of the contact 50. The signal lamp 110 is connected in shunt across the coil 108 and therefore when the latter is energised the lamp 110 will light. This lamp corresponds to the minus signal window indicated at 27 in Fig. 2.

The movement of the insulated distance piece 103 serves also to displace a contact 111 into engagement with a contact 112 carried upon a blade 113. The latter is connected with a terminal 114 upon the terminal strip 44. A lead 115 joins one side of a switch 116 the other side of which is connected to a lead 117 joined to a terminal 118 in the junction box 61. From the terminal 118 a lead 119 passes to one side of a winding 120 the other side of which is connected by a lead 121 to the conducting member 63.

It will now be appreciated that when the contact pair 111 and 112 are closed, a circuit is completed from the terminal 58 of the winding 57 through the terminal 60 of the junction box 61 and by the lead 62 to the conducting member 63 from whence lead 121 connects to one side of the winding 120. The other side of the winding 120 is joined by lead 119 to the terminal 118 and from thence to the switch 116 via the lead 115 to the terminal 114. From this terminal the circuit is completed via the closed contact 112 and 111 thence to terminal 53 and via leads 54 and 55 to the other terminal 56 of the winding 57. The energisation of the coil 120 following the closing of the circuit indicated, causes an armature to be moved (not shown) whereby a deflecting shutter is set for deflection of the work-piece that is being gauged. The winding 120 is energised for the reason that the gauging operation has revealed that a dimension is such as to correspond to undersize of the work-piece and this winding is associated with the shutter which causes the work-piece to be subsequently deflected to the reject opening of the machine. In addition to controlling an armature in the manner indicated, the winding 120 is arranged to control a blade 122 having a contact 123. The latter normally engages a contact 124 but is pulled away from engagement therewith when the winding 120 is energised. There is a further winding 125 corresponding to the winding 120 and intended for operation of a deflecting shutter for deflecting oversize work-pieces. This winding 125 has likewise associated with it a blade 126 having a contact 127 associated with a contact 128 with which it normally co-operates. When the winding 125 is energised, the blade 126 is deflected away from a normal position where it causes the contacts 127 and 128 to be in engagement. It will be seen that both the blades 126 and 122 are connected together and the contact 128 is connected via a lead 129 to a blade 130 having a contact 131. There is an insulated extension 132 secured to the blade 130 and arranged to co-operate with a set-screw 133 adjustably fixed in the extremity of the lever 67. A blade 134 is connected with the conducting member 63 and carries a contact 135 intended to co-operate with the contact 131. In the position of the mechanism illustrated, it will be observed that the contacts 131 and 135 are held out of engagement by the set-screw 133 which is pressing upon the insulated finger 132 of the blade 130. It will however be clear that the contacts 135 and 131 will also be held out of engagement when the follower 71 is on the lowest cam surface 73. It is only when the follower 71 rides upon the periphery of the disc 72 that the lever 67 swings to a position where it permits the contacts 131 and 135 to engage.

Up to the present, in the description hereinbefore, the operation of the machine has been described when the follower 71 occupies a position upon the lowest cam surface 73 and upon the intermediate cam surface 74. When now the disc 72 continues to rotate the follower 71 will next ride upon the periphery of the cam which may thus be regarded as the uppermost cam surface. Under these conditions the lever 67 will swing so as to cause the contact screw 66 to be disengaged from the contact 65. The contacts 88 and 89 will however remain closed. The opening of the contacts 65 and 66 will have no effect except to open the circuit which had previously existed between the measuring device 6 and the coil 51 of the associated relay device. This same circuit had of course, previously been opened when the contact 50 disengaged from the blade 48. However, it is desirable to break this same circuit for a second time for the reason that when the relay device including the coils 51 and 108 is no longer energised, it will not necessarily be desirable that the contact 50 should close onto the blade 48 and thereby produce immediate re-energisation of the coil 51 of the relay device.

In addition to the breaking of the contacts 65 and 66 the movement of the follower 71 onto the periphery of the disc 72 causes the set-screw 133 to ride down to an extent sufficient to allow the contacts 135 and 131 to engage. In the particular example under consideration, it has been assumed that a component has been gauged by the gauging device 6 having the contacts 40 and 41 and has been found undersize with the result that the arm 38 engaged the contact 40. The winding 120 associated with the deflecting shutter for deflecting an undersize component was therefore operated. As will be appreciated, where the winding 120 is operated this indicates that the component under examination is not acceptable. Accordingly the counting mechanism 31 which is to indicate total parts accepted must not be operated in respect of this particular work-piece which is being inspected. This is assured by the opening of the contacts 123 and 124 due to energisation of the winding 120. Assuming for the moment that the winding 120 had not been energised and similarly the winding 125 had also remained de-energised, then under these circumstances both the contact pairs 123, 124 and 127, 128 would have remained closed. Since the contacts 135 and 131 are closed in the position of the mechanism now being described, a circuit might then have been completed between terminals 136 and 137 of a terminal strip 138. This will be appreciated when it is observed that the terminal 56 of the winding 57 is joined by a lead 139 which connects with the terminal 136. The terminal 137 has a connection 140 to a terminal 141 in the junction box 61. From this point a lead 142 connects to the contact 124 and if this contact is in engagement with the contact 123, the circuit is continued through the contact pair 127, 128 through the lead 129 to the blade 130. Assuming that the contact pair 131, 135 are in engagement, the circuit is continued through the blade 134 to the conducting member 63 from whence by means of lead 62, terminal 60 and connection 59, a junction is made with the terminal 58 of the winding 57. The other terminal 56 of this same winding is already connected to the terminal 136 and therefore a circuit is closed as between the terminals 136 and 137. The contact strip 138 is intended to receive a relay device of precisely the character generally indicated at R in Fig. 4 and shown in detail diagrammatically in Fig. 6, and therefore if a circuit is completed as between the contacts 136 and 137 the starting winding corresponding to the winding 51 of the relay device R is energised. As will be recalled, this has the effect of energising the main winding 108 and of effectively disconnecting the terminal 137 (corresponding to the terminal 43) from the relay device. The terminal 143 is however, brought into the circuit of the main relay winding. It will be observed that this terminal is connected by a link to the lead 140 which is joined with the terminal 141. The main winding will thus be connected to the circuit previously used to energise the starting winding. When the main winding of the relay is energised, the counting mechanism thereof indicated at 31 in Figs. 2 and 4 records the fact. It will be understood that the counting mechanism will not operate until the main winding of the relay is excited and this can only occur where the circuit of the starter winding as between the terminals 136 and 137 is first closed. This latter condition is fulfilled only if the contacts 123, 124 and also 127, 128 are closed and if moreover the contact pair 131, 135 is closed. Once the starting winding has been energised, the circuit is transferred to the main winding as between the terminals 136 and 143 and these will continue to have a circuit completed between them as long as the contacts 131 and 135 remain closed. The "O. K." lamp 30 is illuminated when the main winding of the relay is energised.

In the example of operation which is being considered for the purposes of description, the winding 120 has operated and accordingly the contact pair 123 and 124 have been separated. Under these conditions the relay associated with the terminal strip 138 will not be energised and the closing of the contacts 131 and 135 will have no effect. The follower 71 therefore continues to ride around upon the periphery of the disc with only the contacts 88 and 89 effectively co-operating. So long as these contacts remain closed, the main winding 108 of the relay R will continue to be excited and will hold the contacts 111 and 112 into engagement, with the result that the winding 120 will continue to be excited. This allows sufficient time for the work-piece that is being gauged to be withdrawn from the gauging position and to be directed into a chute in which is included a deflecting shutter under the control of the winding 120. As the disc 72 continues to rotate, the follower will leave the periphery of the disc and will fall to its lowest extent upon the cam surface 73 once more. By this time the work-piece which has been gauged will have fallen through the outlet chute and will have been deflected according to the results of gauging. The next work-piece will be in the gauging position and the follower 71 will cause the lever 67 to swing to a position where the contacts 88 and 89 are disengaged, and the contacts 65 and 66 brought into co-operation. Simultaneously the contacts 135 and 131 will be disengaged. Thus the main winding 108 of the relay R will no longer be energised since its circuit will be broken when the contacts 88 and 89 are separated, and therefore the winding 120 will no longer be energised since the contacts 112, 111 will separate. The contact 123 will therefore be released to engage the contact 124 once more. The cycle may now recommence for the next work-piece.

It is to be observed that during the time when actual gauging is taking place and when for example the arm 38 was engaging the contact 40 for the first time, no circuit was closed by the co-operation of the arm 38 with the contact 40. Thus no undesirable sparking occurred during the delicate gauging operation. It was only after the gauging had taken place that the follower 71 rose up onto the intermediate cam surface 74 and caused the contacts 88 and 89 to co-operate, thereby exciting the starting winding 51 of the relay. When the main winding 108 operated as a result, this served to disconnect the measuring device 6 from the circuit so that if thereafter the work-piece had been immediately removed, then whether it had been gauged as undersize as in the example, or as oversize or nominally correct, if the arm 38 should nevertheless co-operate with the contact 40 when the work-piece be removed (removal of the work-piece may have the effect of causing an indication that an undersize work-piece is present when in fact no work-piece is in position), this will not have any undersirable effect, since the measuring device 6 will be isolated until a next work-piece is in position and is being gauged.

A terminal strip 149 is associated with the second measuring device 6 and is concerned with the undersize indications thereof. This measuring device 6 has a contact 150 which is joined over the terminal strip 44A by lead 151 to the terminal 152 of the terminal strip 149. The terminal 153 of the strip 149 has a lead 154 extending to one side of a switch 155 which at its other side is connected to the lead 117. The other terminals of the terminal strip 149 are connected in parallel with corresponding terminals upon the strip 44. A relay R is connected upon the terminal strip 149. This relay will be understood to operate in precisely the same manner as the relay R associated with the strip 44.

A terminal strip 156 is associated with the undersize gauging movements of the measuring device 7. The contact 157 of the device 7 has a lead 158 connected to a terminal 159 upon the terminal strip 156. The terminal 160 is in a like manner connected by a lead 161 to a switch 162 the other side of which is also connected to the lead 117. The remaining terminals of the terminal strip 156 are connected in parallel with the corresponding terminals of the strips 44 and 149. Again, a relay R precisely similar to that associated with the terminal strip 44 co-operates with the terminal strip 156.

There is a further terminal strip 163 of precisely the same kind as the terminal strips previously described and intended to co-operate with an exactly similar relay device R. In this case however the indicating lamp associated with the relay device is omitted since it is desired only that the counting mechanism should be operated by the relay so as to indicate "Total parts submitted." The counting mechanism of this relay device is identifiable with the counting mechanism shown at 32 in Fig. 2. The terminals 164 and 165 which are associated with the starting winding of the relay are respectively connected by leads 166 and 167 to the terminal 56 of the transformer secondary winding 57 and to one side of a switch 168. The switch 168 corresponds to the switch 37 shown in Fig. 1 and is closed when a work-piece is in position for gauging. The other side of the switch is joined by a lead 169 to the other terminal 58 of the winding 57. Thus when a part is submitted and causes the contacts of the switch 168 to close, a circuit is completed through the starting winding of the associated relay. The terminal 170 of the strip 163 is connected with the lead 92 so that when the main winding of the relay is brought into circuit as between the terminals 164 and 170 the circuit through these terminals is completed via lead 92, terminal 91, lead 90, contacts 88 and 89, conducting member 63, lead 62, terminal 60, lead 59 and hence terminal 58 of the winding 57. The main excitation winding of the relay therefore continues to operate until the contacts 88 and 89 are broken. It will be observed that the contact strip 163 has the terminal X joined by a lead Y to one side of the switch Z. Thus if the main winding of this relay operates, the terminals X and 164 are effectively bridged and the switch Z is by-passed.

From the description so far given of the operation of the switch Z it may appear completely superfluous. It is included for the following reason. If the machine should be operated without actively submitting work-pieces for gauging, the relays concerned with undersize indications may record that undersize work-pieces are being submitted when in fact no work-pieces are being presented for gauging. This error of recording could be detected by checking against the "Total parts submitted" since the relay associated therewith will not operate under these circumstances as the switch 168 will not be closed. To avoid this inconvenience the switch Z is included and it is closed when the switch 168 is closed. It likewise remains open if the switch 168 is open. Hence if the machine runs empty (i. e. without work-piece feeding) the switch Z breaks the return circuit of all the other relays to the terminal 56 of the winding 57. If a machine is operated without a "Total parts submitted" relay, then the switch Z remains closed or is omitted, as desired.

The contact strip 47 previously referred to, is likewise furnished with a relay device R. The terminal strip 47 is concerned with the oversize gauging indications of the first described measuring device 6. The terminal 46 and the terminal 171 are concerned with the starting winding of the relay. The terminal 171 is joined to a lead 172 connected to the lead 139 which extends to one side of the transformer winding 57. The other terminal 46 as already seen hereinbefore, is associated with the contact 41 of the measuring device 6. The terminal 173 of strip 47 is joined by a lead 174 to one side of the switch 175 which connects to a lead 176 joined with a terminal 177 in the junction box 61. From the terminal 177 there is a connection 178 to the electro-magnetic winding 125. This winding is arranged to control the oversize shutter in the work-piece outlet chute.

The terminal 179 of the strip 47 is joined by a lead 180 which connects with the lead 144. It will now be understood that if the arm 38 of the measuring device 6 engages the contact 41, a circuit may be completed to the starting winding terminals 171 and 46 in the following manner, terminal 56 of the winding 57 via lead 139, 172 to the terminal 171, the starting winding of the relay, the terminal 46, the lead 45, the contact 41, arm 48 to earth as at 70, from thence to earthed lever 67 contact screw 66, contact 65, contact 88, contact 89, conducting member 63, lead 62, terminal 60, lead 59 and hence to terminal 58 of the winding 57. As soon as the main winding of the relay comes into operation a parallel circuit isolating the measuring device 6 is completed as between terminals 179 and 171 over the contacts 88 and 89 (this circuit being maintained after the contacts 66 and 65 have separated).

The contact strip 181 has the same relation to the contact strip 47 as did the contact strip 149 have to the contact strip 44. The contact strip 181 is intended again to receive a precisely similar relay device R and the starting winding terminal 182 is joined by a lead 183 to the contact 184 of the measuring device 6. The terminal 185 has a lead 186 connected to one side of a switch 187 the other side of which is joined to the lead 176. The other terminals of the strip 181 are joined in parallel with the corresponding terminals of the strip 47.

Finally the terminal strip 188 is associated with the oversize indications of the measuring device 7. The starting winding terminal 189 has a lead 190, joined to the contact 191 of the measuring device 7. The terminal 192 is joined by a lead 193 to one side of a switch 194 connected to the common lead 176. The other terminals of the strip 188 are joined in parallel with the corresponding terminals of the strips 47, 181 and 138 (it being noted in the case of this last mentioned terminal strip 138 that the upper terminal is unused).

From the wiring diagram of Figs. 4, 5 and 6, it will be clear that the apparatus is conveniently divided into two main parts through the junction box 61. The latter may in fact take the form of a plug and socket and all the devices upon the mains side of the junction box 61 are housed in the casing 32 in which there are also included the work-piece feeding arrangements. The other apparatus upon the other side of the junction box 61 is preferably mounted behind the panel 19. A single multi-strand lead may then be employed for supply of the electrical circuit behind the panel 19.

Fig. 3 shows a section through the casing 32 and serves to indicate the mechanical feeding arrangements and also the drive to the disc 72 the cam surfaces of which operate the lever 67 and control the various contacts associated therewith which contacts may be collectively identified as "the master switch." The casing 32 houses the electric motor 75 having an output shaft 200 driving, through a compound gear train 201, a toothed annulus 202. The latter is secured to a collar 203 which internally has ball bearings 204 and 205 serving to support it from a short shaft 206. The shaft 206 is immovably secured to the housing by a machine screw 207 and distance piece 208. Three cam discs 209, 210 and 72 are secured upon the sleeve 203 with the aid of spacing washers 211. The disc 72 peripherally bears the cam faces shown at 73 and 74 in Fig. 5 and has the co-operating follower 212 corresponding to the follower roller 71 of Fig. 5. The lever 67 associated with the roller is carried in a bracket 213 and the switching arrangements of the master switch are not shown for the reason that they are diagrammatically illustrated in detail in Fig. 5.

The work-piece holder consists of two slide blocks 214 and 215 which are slidably carried through the intermediary of lateral rollers (not shown). The right hand end (as seen in Fig. 3) of the slide block 214 is formed with a central slot 216. Work-piece supporting ridges 218 are formed on both the upper and lower slide blocks 214 and 215 so that a work-piece W may be supported between them. The actual formation of the work-piece holder for the gripping of the work-piece W will of course vary according to the nature and size of the work-piece. Both the upper and lower slide blocks 214 and 215 will have to be gapped in such manner that the gauging and reference anvils may reach without hindrance, those surfaces of the work-piece which have to be callipered. The design of the work holder must also be such that when the slide blocks 214 and 215 move relative to one another (to cause the ridges 218 to move relatively away from one another) the work-piece W may drop into the outlet chute 219.

The upper slide block 215 has a slot 220 in which a tension spring 221 is mounted, one end of such spring being hooked upon a peg 222 integral with the upper block 215. The other end of the spring is hooked to a peg 223 which is secured in the lower slide block 214. The spring 221 therefore tends to pull the slide blocks away from their work supporting position. Both the slide blocks are supported by side members carried upon a plate 224, and this plate is gapped as at 225 to permit a sleeve 226 fixed to the lower slide block 214 to project therethrough. The lower end of the sleeve 226 carries a freely rotatable roller 227 which engages the periphery of the cam disc 210. It will be understood that the spring 221 holds the follower 227 firmly upon the periphery of the cam disc 210. In a similar manner the plate 224 is gapped as at 228 and allows a sleeve 229 to depend therethrough, such sleeve being fixed to the upper slide block 215. The lower slide block 214 is gapped at 230 to permit the sleeve 229 to pass freely therethrough. A roller 231 is mounted for rotation upon the sleeve 229 and engages upon the periphery of the cam disc 209. Again, it will be appreciated that the spring 221 serves to hold the roller 231 into engagement with the periphery of the cam disc 209.

Depending upon the nature of the work-pieces which the machine has to examine, the feed arrangements for ejecting the work-pieces into the work-piece holder, will vary considerably. Merely for the sake of illustration, in Fig. 3 a very simple form of supply for the work-piece W is illustrated. This hopper essentially consists of a passage member 232 arranged to bring the work-pieces W to an aperture in a stationary plate 233. In the illustration of Fig. 3 the work-piece holder having the two slide blocks is shown in its extreme limit of movement towards the left and corresponds to the position of the work-piece holder for reception of a new work-piece. An escapement mechanism serves to feed one work-piece at a time to the work-piece holder when it is in this work receiving position. This feed may be achieved in various ways and a slidable member 234 is shown which has an aperture 235 capable of receiving one work-piece when the aperture is in register with the aperture of the plate 233. The member 234 is moved periodically from the position illustrated to a discharge position where the aperture 235 lies over the work holder ridges 218. The member 234 may be driven from reciprocating mechanism operating with power derived from the motor 75 so that the movement of this member 234 is synchronised with the drive to the work-piece holder itself, and hence the member 234 can move up to a work discharge position at the moment when the work-piece holder is ready to receive the next work-piece.

The cam discs 209 and 210 are designed in such manner that the following operation is obtained; after a component or work-piece W has been received by the work holder and supported upon the ridges 218, the slide blocks 214 and 215 are both carried to the right by the sleeves 226 and 229 secured to them. The slide blocks move completely in unison and hence carry the work-piece immediately to the gauging position. In the gauging position there is a pause and then both slide blocks begin to return to the left. When the ridges 218 are both located above the open end of the chute 219, the slide block 215 accelerates relative to the slide block 214, so that the ridges 218 separate and the component is dropped into the chute 219. Thereafter the slide block 214 accelerates so as to regain the work-piece receiving position by the time the two blocks have returned to the position illustrated in Fig. 3. It will be appreciated that when the work-piece holder is pausing with the work-piece in the gauging position, the cam surfaces 73 and 74 are being encountered by their co-operating follower 71.

The chute 219 communicates directly with the outlet aperture 35 and when a work-piece is dropped into the mouth of the chute it will normally emerge through this outlet 35. There are however two shutters 240 and 241 associated with this chute. These shutters are controlled respectively by wheels 242 and 243 which have pins 244 and 245 engaging in arms 246, 247. A true central section through the chute 219 would not reveal the shutter 241 since it lies laterally upon that side of the chute 219 which would not appear in a central section seen in the direction corresponding to the section of Fig. 3. In a like manner both the deflecting chutes associated with each of these shutters would not appear. These deflecting chutes are however, both indicated to make the arrangement clear. There is a deflecting chute 248 associated with the deflecting shutter 241 and a further deflecting chute 249 associated with the shutter 240. The outlets of these chutes are indicated at 34 and 33.

If the shutter 241 should be caused to occupy a position where it lies across the main chute 219 any component passing through the main chute mouth 219 will be laterally deflected into the chute 248 and will appear through the outlet aperture 34. Should the shutter 241 remain in a normal inoperative position where it merely comprises a part of the main chute side walls, and if the shutter 240 swings over to a position where it lies across the main chute passage 219, then any component passing through the main chute will be deflected through the chute 269 to the outlet 33. The lever 247 associated with the shutter operating mechanism of the shutter 241 is under the control of an electro-magnetic device having the energising winding indicated at 120. The lever 246 of the shutter 240 has a similar control from a winding 125. These windings will be seen to correspond to the windings similarly numbered in Fig. 5 of the drawings. The winding 120 is energised when a piece is gauged as undersize, and when this winding is energised the deflecting shutter 241 lies across the main chute 219 and assures that the component gauged as undersize will emerge through the outlet 34. Assuming that no dimension of the work-piece corresponds to undersize, and assuming that one or more dimensions correspond to oversize, then the other shutter 240 will be operated by its winding 125 and the work-piece so gauged will emerge through the outlet aperture 33.

It will be noted that the shutter corresponding to undersize operates before the shutter corresponding to oversize with reference to the direction of travel of a work-piece through the main chute. Thus even though some dimensions of the work-piece may correspond to oversize, nevertheless if there is one dimension corresponding to undersize the work-piece will be rejected through the outlet aperture 34. This condition may be important when it is realised that undersize of a work-piece in any respect could be a fatal objection to that work-piece in the sense that it could not necessarily be altered to render it acceptable. On the other hand work-pieces which are oversize can usually, if so desired, be further treated so as to render them acceptable.

The above remarks concerning rejection of pieces which are undersize will not of course apply generally and work-pieces which are undersize in some respect may not in fact have to be rejected where for example they are to fit into other work-pieces which could be specially shaped for the reception of undersize pieces. There may be other particular conditions surrounding inspection of a particular work-piece which serve to alter the circumstances previously indicated.

In the above described example of the manner in which the invention may be carried into effect essentially a simple three dimension machine has been described. The principles disclosed serve as a basis for construction of other machines which might for example inpect simultaneously ten or more dimensions of a work-piece. The switches 116, 175 and 155, 187 and 162, 194 serve to allow the effect of oversize or undersize in each of the three inspected dimensions to be cancelled at will. These switches may be located upon the panel 10 as shown in Fig. 2. Thus if the switch 116 is brought to the "off" position then if the associated measuring device 6 should record undersize of the work-piece the winding 120 will not be energised and the piece will not be rejected through the outlet opening 34 if the dimension concerned represents undersize of the piece. In a like manner all the other measuring devices have switches which nullify the effect of their recording oversize or undersize in the inspected work-piece. Various schemes of inspecting and sorting may be carried out following the principles of the invention. Thus more than one deflecting shutter for deflecting undersize pieces might be incorporated, such shutters being arranged in a series so that a most important dimension of the work-piece effects the setting of the first shutter in the chute with reference to the direction of travel of a work-piece through the main chute. In this manner the first shutter will cause deflection of all those work-pieces which have say an undersize concerned with the most important dimension. If the work-pieces happen to be incorrect as regards another less important dimension then they could be subsequently deflected through another shutter. Other sorting arrangements will become apparent from consideration of the principles of the present invention and the desiderata surrounding the inspection of particular work-pieces for particular purposes.

The machine described above need not necessarily be fully automatic and could be semi-hand operated in the sense that work-pieces could be placed by hand in the work-piece holder and removed therefrom after gauging. From the indications of the signal lights the work-pieces could be hand sorted and the automatic sorting mechanism described could then be dispensed with. In the case where the automatic sorting is emloyed, the signal lamp indication of the result of inspection could be dispensed with.

It may be mentioned incidentally that the "O. K." window shown upon the panel 10 will of course correspond to the signal lamp associated with the relay device operating in conjunction with the terminal strip 138. This relay device operates only when a part is found acceptable and the lighting of the "O. K." lamp will therefore mean that neither of the windings 120 and 125 have been energised and therefore none of the gauging devices has detected any deviation of the component from nominal correctness.

The counting mechanism represents a highly desirable feature of the machine since it permits tabulation of the results of inspection. It will however be clear that in certain cases some or all of the counting mechanism could be dispensed with.

We claim:

1. A machine for inspecting and sorting workpieces comprising a plurality of gauging devices, a work-piece holder arranged to be moved from a work-piece receiving position to a gauging position and to a discharge position, two electric circuits associated with each gauging device one of which can be rendered capable by the gauging device of being energised when the latter records "oversize" whilst the other of which can be rendered capable by the gauging device of being energised when the latter records "undersize," a relay in each of said circuits, a starting winding and a main winding in each such relay, said starting winding serving to bring the main winding into operation which then renders the starting winding inoperative, electro-magnetic sorting means under control of the main windings of the relays so as to be set selectively according to the results of gauging, and a master switch operating cyclically in synchronism with said work-piece holder and having three settings the first corresponding to initial mechanical gauging of the work-piece when such master switch serves to de-energise said circuits and said main windings, the second setting allowing said circuits to be energised whilst said gauging devices are recording the results of gauging and the third setting causing the gauging devices to be isolated but permitting the main windings to continue to operate if they have been brought into operation.

2. A machine for inspecting and sorting workpieces comprising a plurality of gauging devices, a work-piece holder arranged to be moved from the work-piece receiving position to a gauging position where the work-piece is simultaneously gauged by all said gauging devices, electric circuits associated with said gauging devices and arranged to be selectively energised according to the results of gauging, a master switch operating cyclically, a first pair of electrical contacts associated with said master switch and common to all said circuits, timing means associated with said master switch to ensure that said contacts are open and the circuits therefore de-energised whilst initial mechanical gauge setting is actually taking place and also to ensure that said contacts are closed and said circuits thus energised before a work-piece is withdrawn from the gauging position, a relay in each electrical circuit, a second pair of electrical contacts in each said circuit, each said second pair of contacts being under control of the relay in the same circuit, said contacts being arranged to engage when the relay in the same circuit is inoperative but to disengage when the relay in the same circuit is energised, thus ensuring that the electric circuit to the associated gauging device is interrupted before the work-piece is withdrawn from the gauging position, driving means for the master switch and the work-piece holder to operate them in synchronism, electro-magnetically operable sorting means under control of said circuits so as to be set selectively according to the results of gauging and thereby permit automatic sorting of the work-pieces.

3. A machine for inspecting and sorting work-pieces comprising a plurality of gauging devices, a work-piece holder arranged to be moved from a work-piece receiving position to a gauging position where the work-piece is simultaneously gauged by all said gauging devices, electric circuits associated with said gauging devices and arranged to be selectively energised according to the results of said gauging, a master switch operating cyclically, a first pair of electrical contacts associated with said master switch and common to all said circuits, timing means associated with said master switch to ensure that said contacts are open and the circuits therefore de-energised whilst initial mechanical gauge setting is actually taking place and to ensure also that said contacts are closed and said circuits are thus energised before a work-piece is withdrawn from the gauging position, a first relay in each circuit, a second pair of electrical contacts in each said circuit, each said second pair of contacts being under control of the relay in the same circuit and each said second pair of contacts being arranged to engage when the relay in the same circuit is inoperative, but to disengage when the relay in the same circuit is energised, thus ensuring that the electrical circuit to the associated gauging device is interrupted before a work-piece is withdrawn from the gauging position, a third pair of electrical contacts in each circuit, said third pair of contacts being arranged to close when the said second pair of contacts disengage, a second relay in circuit with all those third pairs of electrical contacts which correspond to an undersize gauged measurement of the work-piece, a third relay in circuit with all those third pairs of electrical contacts which correspond to an oversize gauged measurement of the work-piece, said second and third relays being operated whenever any one third pair of contacts associated therewith closes, sorting means controlled by said second and third relays so as to sort work-pieces according to the operation of the second and third relays, driving means for the master switch and the work-piece holder to operate them in synchronism.

4. A machine according to claim 3, and further comprising a first switch under control of said second relay and a second switch under control of said third relay, said switches being in series with each other and each being arranged to open when the relay associated therewith is energised, a tabulating mechanism in series with said switches, said tabulating mechanism indicating the number of "Total parts accepted," and means for energising the circuit comprising the first and second switch and the tabulating mechanism when both said first and second switches remain closed after a gauging operation.

FREDERICK ROBERT BOOSEY.
JOHN LOXHAM.
ALBERT EDWARD CASTLETON.
CHARLES JOHN HART.

REFERENCES CITED

The following references are of record in the file of this patent:

UNITED STATES PATENTS

| Number | Name | Date |
|---|---|---|
| 1,758,268 | Wagner | May 13, 1930 |
| 1,873,315 | Dreyer | Aug. 23, 1932 |
| 1,894,025 | Dennison | Jan. 10, 1933 |
| 2,018,399 | Engst | Oct. 22, 1935 |
| 2,254,812 | Aller | Sept. 2, 1941 |
| 2,321,191 | Elmendorf | June 8, 1943 |
| 2,352,507 | Aller | June 27, 1944 |
| 2,392,856 | Martinec | Jan. 15, 1946 |